US009532116B2

(12) United States Patent
Terpe

(10) Patent No.: US 9,532,116 B2
(45) Date of Patent: *Dec. 27, 2016

(54) INTERACTIVE VIDEO ADVERTISEMENT IN A MOBILE BROWSER

(71) Applicant: RhythmOne, LLC, San Francisco, CA (US)

(72) Inventor: Steven Richard Terpe, San Jose, CA (US)

(73) Assignee: RhythmOne, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,716

(22) Filed: Dec. 7, 2015

(65) Prior Publication Data

US 2016/0088369 A1    Mar. 24, 2016

Related U.S. Application Data

(63) Continuation of application No. 13/752,125, filed on Jan. 28, 2013, now Pat. No. 9,237,367.

(51) Int. Cl.
*H04N 7/173*    (2011.01)
*H04N 21/858*    (2011.01)
(Continued)

(52) U.S. Cl.
CPC ........ *H04N 21/858* (2013.01); *H04N 21/2393* (2013.01); *H04N 21/23424* (2013.01);
(Continued)

(58) Field of Classification Search
CPC  H04N 21/236; H04N 21/4307; H04N 21/431; H04N 21/234327
See application file for complete search history.

(56) References Cited

U.S. PATENT DOCUMENTS

| 5,929,849 A | * | 7/1999 | Kikinis | ............ | H04N 5/44543 |
| | | | | | 348/E5.002 |
| 7,721,307 B2 | * | 5/2010 | Hendricks | ............ | H04H 20/10 |
| | | | | | 725/34 |

(Continued)

OTHER PUBLICATIONS

United Kingdom Combined Search and Examination Report Under Sections 17 and 18(3), United Kingdom Application No. GB1401431.0, Jul. 16, 2014, 6 pages.

(Continued)

*Primary Examiner* — Pankaj Kumar
*Assistant Examiner* — Timothy Newlin
(74) *Attorney, Agent, or Firm* — Fenwick & West LLP

(57) ABSTRACT

A system and a method are disclosed for presenting an interactive video ad in a mobile web browser that does not support embedded video playback in the browser. The interactive video ad comprises an overlay of transparent frame and visible elements, wherein the visible elements include instructions on performing a gesture to interact with the video ad. The system generates an HTML underlay, which is a web page with embedded link to continue playback of the interactive video ad and one or more interactivity options. The HTML underlay is displayed when the gesture is performed. Interactions with the video ad can be selected from the one or more options presented by the HTML underlay.

20 Claims, 8 Drawing Sheets

(51) Int. Cl.
*H04N 21/41* (2011.01)
*H04N 21/431* (2011.01)
*H04N 21/472* (2011.01)
*H04N 21/658* (2011.01)
*H04N 21/81* (2011.01)
*H04N 21/234* (2011.01)
*H04N 21/239* (2011.01)
*H04N 21/84* (2011.01)

(52) U.S. Cl.
CPC ..... *H04N 21/4126* (2013.01); *H04N 21/4312* (2013.01); *H04N 21/47217* (2013.01); *H04N 21/6581* (2013.01); *H04N 21/812* (2013.01); *H04N 21/84* (2013.01)

(56) References Cited

U.S. PATENT DOCUMENTS

| | | | | |
|---|---|---|---|---|
| 9,237,367 | B2* | 1/2016 | Terpe | H04N 21/4126 |
| 2002/0007493 | A1* | 1/2002 | Butler | H04N 5/44543 725/109 |
| 2002/0016969 | A1* | 2/2002 | Kimble | H04N 21/47202 725/87 |
| 2002/0026637 | A1* | 2/2002 | Markel | H04N 5/4401 725/37 |
| 2002/0060750 | A1* | 5/2002 | Istvan | G06F 3/0481 348/569 |
| 2002/0069411 | A1* | 6/2002 | Rainville | H04N 5/44504 725/37 |
| 2002/0078144 | A1* | 6/2002 | Lamkin | G06F 17/30017 709/203 |
| 2002/0078456 | A1* | 6/2002 | Hudson | G06F 17/30017 725/60 |
| 2002/0100063 | A1* | 7/2002 | Herigstad | H04N 7/163 725/141 |
| 2002/0162117 | A1* | 10/2002 | Pearson | H04N 5/445 725/109 |
| 2002/0176692 | A1* | 11/2002 | Otsuka | H04N 5/9305 386/230 |
| 2003/0028873 | A1 | 2/2003 | Lemmons | |
| 2003/0149988 | A1* | 8/2003 | Ellis | H04N 5/44543 725/87 |
| 2003/0229900 | A1* | 12/2003 | Reisman | G06F 17/30873 725/87 |
| 2004/0257369 | A1* | 12/2004 | Fang | G06T 1/00 345/501 |
| 2005/0005302 | A1* | 1/2005 | Zigmond | H04N 21/858 725/109 |
| 2005/0086382 | A1* | 4/2005 | Ramaswamy | H04L 67/36 709/246 |
| 2008/0165148 | A1* | 7/2008 | Williamson | G06F 3/04883 345/173 |
| 2009/0106639 | A1* | 4/2009 | Blinnikka | G06F 17/30053 715/200 |
| 2011/0164143 | A1* | 7/2011 | Shintani | H04N 21/44218 348/222.1 |
| 2012/0131454 | A1* | 5/2012 | Shah | G06F 3/04883 715/702 |
| 2012/0167001 | A1* | 6/2012 | Ortiz | G06F 3/005 715/781 |
| 2013/0151352 | A1 | 6/2013 | Tsai et al. | |
| 2013/0171607 | A1* | 7/2013 | Markiewicz | G06F 3/017 434/365 |
| 2013/0205333 | A1* | 8/2013 | Han | H04N 21/812 725/32 |
| 2013/0227414 | A1 | 8/2013 | Hwang et al. | |
| 2016/0088369 | A1* | 3/2016 | Terpe | H04N 21/4126 725/32 |

OTHER PUBLICATIONS

United Kingdom Examination Report Under Section 18(3), United Kingdom Application No. GB1401431.0, Jul. 8, 2015, 2 pages.
United States Office Action, U.S. Appl. No. 13/752,125, filed Mar. 20, 2015, 7 pages.
United States Office Action, U.S. Appl. No. 13/752,125, filed Dec. 1, 2014, 13 pages.
United States Office Action, U.S. Appl. No. 13/752,125, filed May 5, 2014, 12 pages.

* cited by examiner

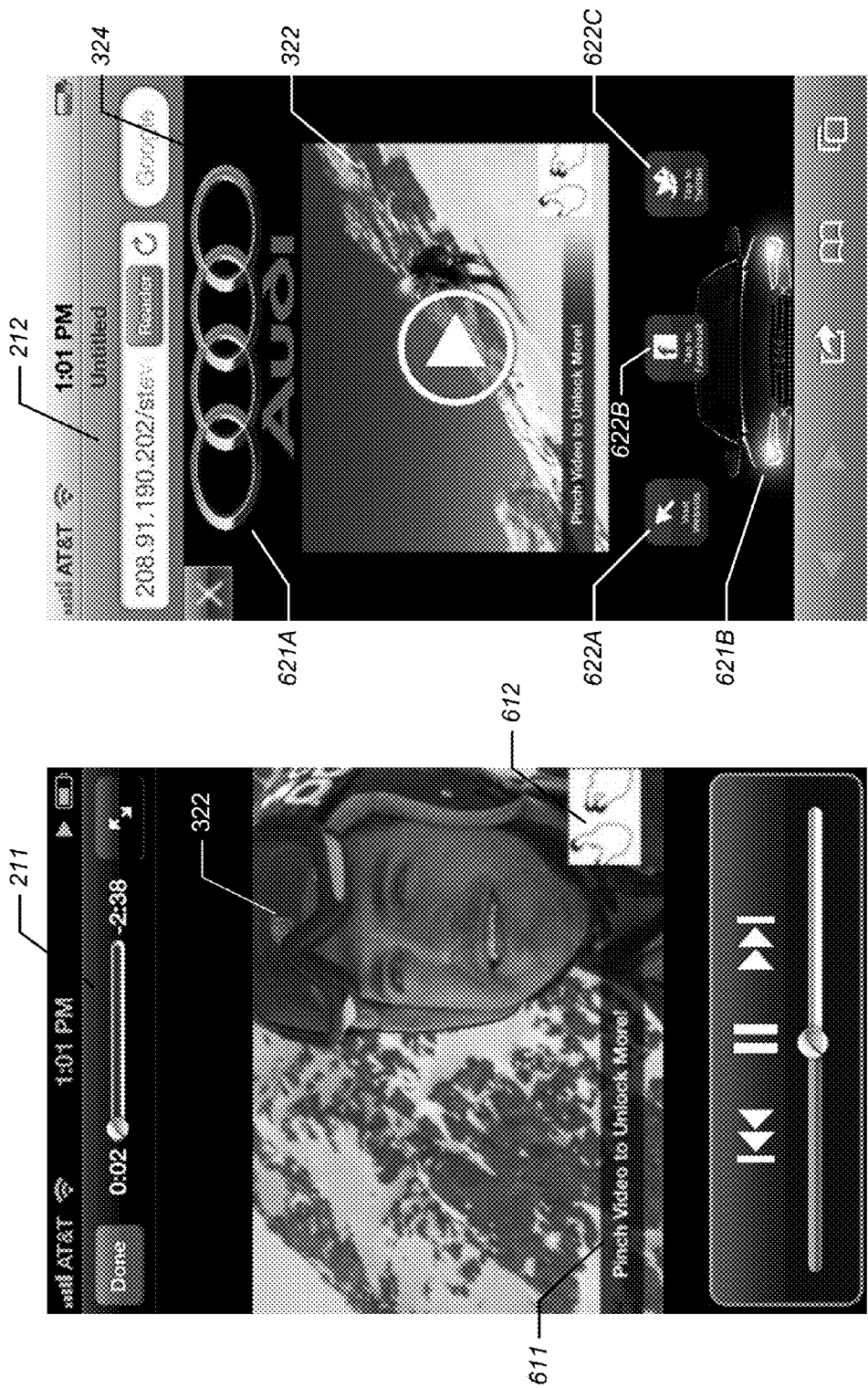

INTERACTIVE VIDEO ADVERTISEMENT IN A MOBILE BROWSER

CROSS-REFERENCE TO RELATED APPLICATIONS

This application is a continuation of and claims the benefit of U.S. application Ser. No. 13/752,125, entitled "Interactive Video Advertisement in a Mobile Browser" filed on Jan. 28, 2013, which is hereby incorporated herein by reference in its entirety.

BACKGROUND

1. Field of Art

The disclosure generally relates to the field of creating an interactive video experience in mobile web browsers that do not support embedded video playback in the browser.

2. Description of the Related Art

Mobile devices, such as smart phones and tablets, have become prevalent in recent years. Given the enormous and fast-growing market, mobile advertising has become a fast-developing and far-reaching industry. In addition to traditional media, such as text banners or posters, a growing trend in mobile advertising is to include rich media within the ads. For example, interactive video that can be played and expanded to a full screen, offering advertisers a better way to communicate their message and attract viewers' engagements. In the context of application development (in-app) for smart phone and tablet devices, interactive video is traditionally generated with an accompanying hypertext markup language (HTML) overlay which contains visible (opaque) elements arranged over a transparency. Both the video and the overlay run in the same application context, with the application playing the video while placing the HTML overlay on top of the video. The visible elements of the overlay may be buttons or any elements that respond to user's touch or gesture, and once tapped by user, perform other actions or invoke different applications.

However, HTML5-capable mobile browsers on many smart phones do not support this use of an overlay to build interactive video. This is because the video is immediately passed by the browser to the native media player. The native media player runs outside the application context of the mobile browser (though it may pass some video events back to the browser). Because the media player is instantiated outside of the browser application context at the top of the view-stack, there is no way for the browser to place a traditional HTML overlay above the running video. Neither have the media players the capability to insert such an overlay into the video themselves.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 6A-6F illustrates an example of a series screenshots of the interactive video playing experience on a user device.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

One embodiment of a disclosed system (and a method and a computer readable storage medium) that provide interactive video playback with an HTML underlay. The system receives a request for a video ad file from mobile browsers on user devices. Based on the device type, the system generates an HTML underlay, which is a web page with embedded link to an interactive video ad encoded from the video ad file overlaid with transparent frames and visible elements. The visible elements include text or graphic instructions on how to use a gesture to interact with the video ad. The HTML underlay is hidden while the video ad is played by the native media player. A JavaScript code is used to monitor the video playback and manipulate HTML underlay. The HTML underlay is displayed with more interactivity options when the user performs the gesture to interact. In essence, the gesture is to close the native media player and interpreted as a signal to start presenting interactivity options with the video ad.

This interactive video playing process involves video encoding and HTML underlay to create an interactive video experience in browsers on mobile devices where minimal conditions are met with respect to the native media player. First, the native media player is capable of communicating video events back to the mobile browser, at least information regarding the current video playback state, time and duration. Second, the native media player responds to an assigned touch gesture for the close command. For example, the native media player on APPLE iPHONE closes when it receives a 'pinch' gesture. Note that the HTML underlay is designed for those mobile devices which cannot play video inline (i.e., within the hosting web page). When a video is played from a web page within the mobile browser, the native media player opens on top of the mobile browser and all HTML elements on the web page are inaccessible.

Computing Machine Architecture

Figure 1:
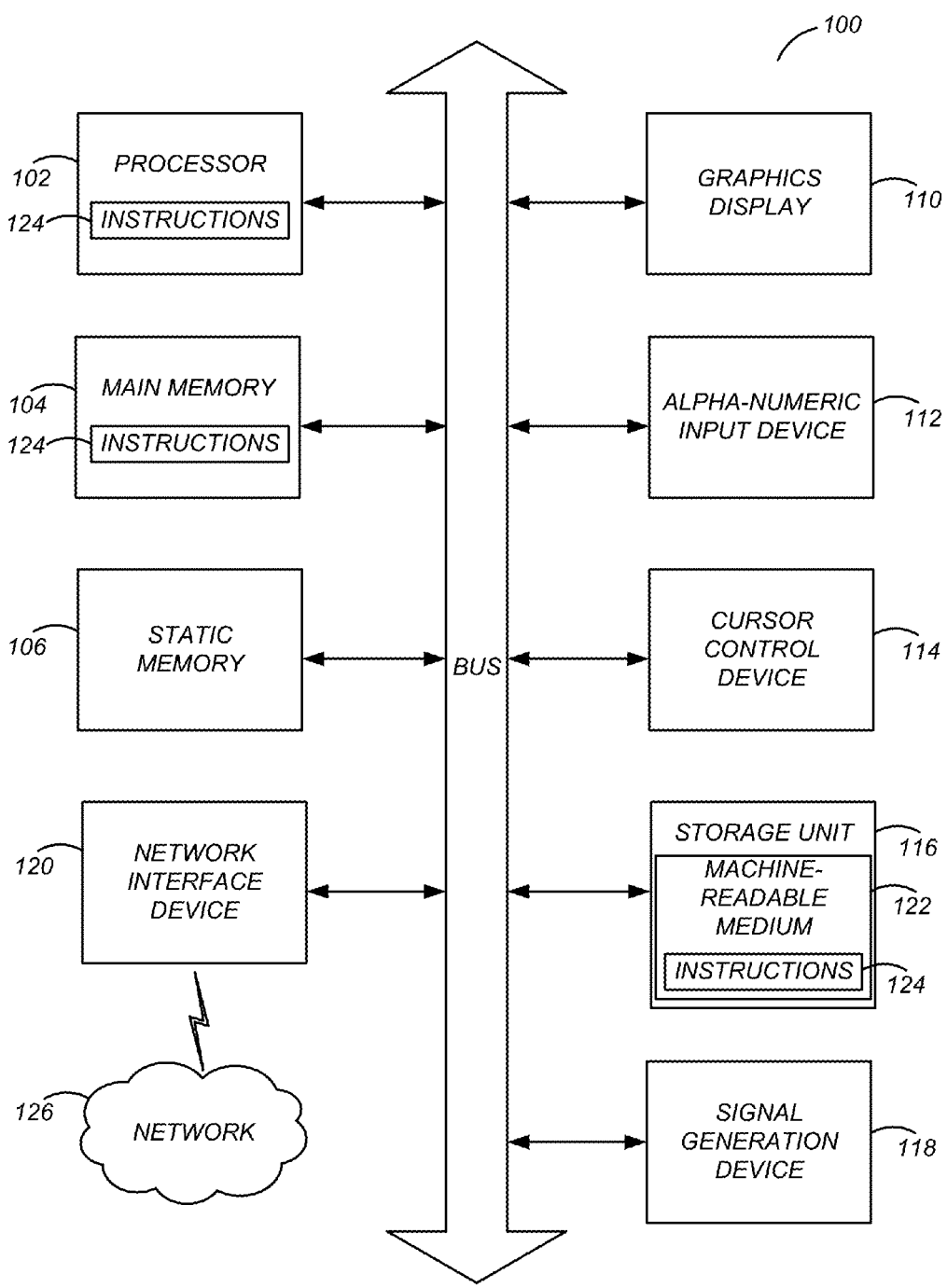
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller) to implement the disclosed system for displaying animated images with adaption to network conditions. Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

HTML Underlay for Interactive Video Ad

Figure 2:
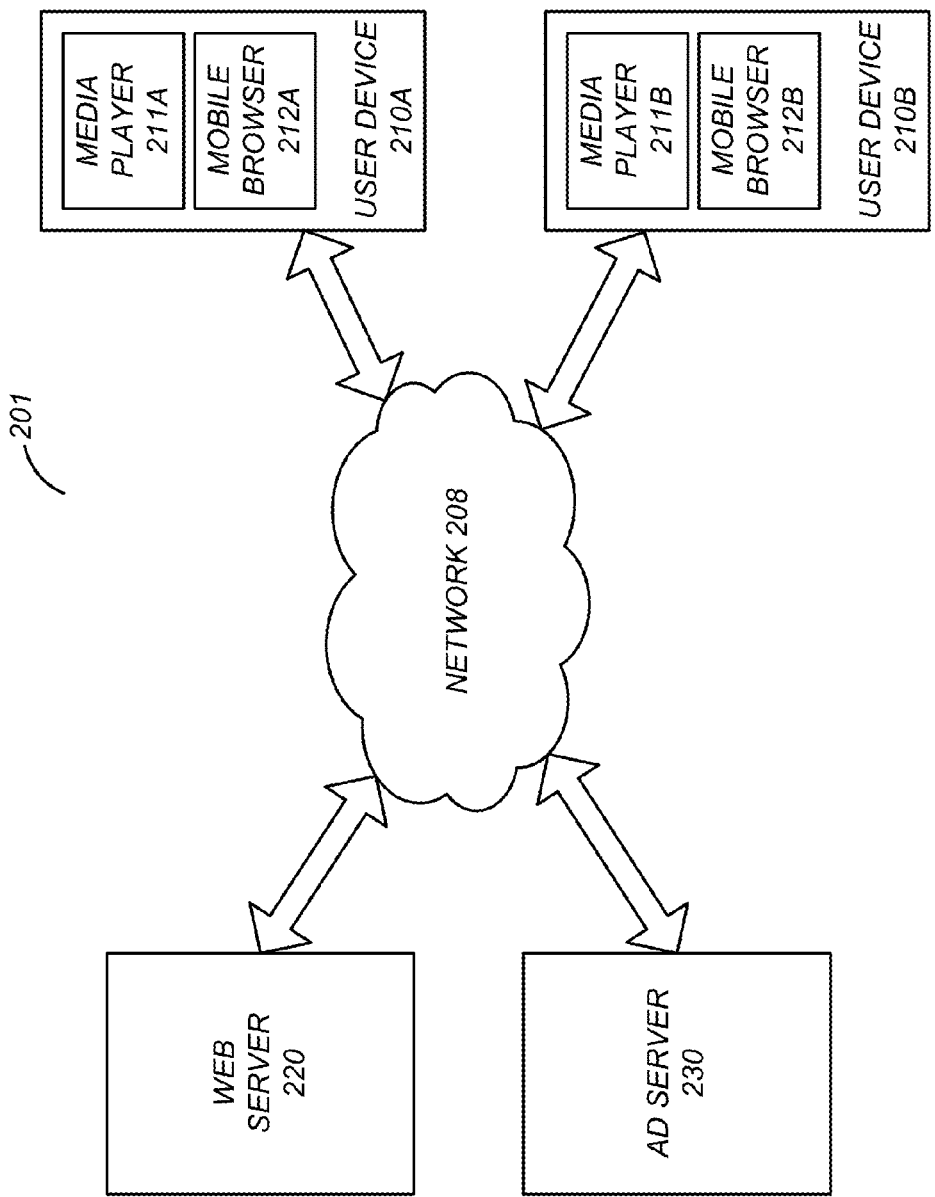
FIG. 2 illustrates a high-level block diagram of an example communications environment for providing interactive video ad with an HTML underlay.

Turning now to FIG. 2, it illustrates a high-level block diagram of an example communications environment 201 for providing interactive video with an HTML underlay. The environment 201 comprises a web server 220, an ad (advertisement) server 230, user mobile devices 210, and a network 208. The network 208 is a communication network that transmits data between the user mobile devices 210 and the servers 220 and 230. In one embodiment the network 208 includes wireless network and the Internet.

The user mobile devices 210 are electronic devices with media players 211 and mobile web browsers 212 installed. The user mobile devices 210 may include netbooks, tablets, smart telephones, or personal digital assistants (PDAs). While only two user mobile devices 210A and 210B are illustrated in FIG. 2, the environment 201 may include thousands or millions of such devices. The media players 211A and 211B are native media players running on the user devices 210 for playback video and audio files. The mobile web browsers 212A and 212B are specific software applications running on mobile devices 210 for retrieving web content from the web server 220 and presenting the web page inside the browser window. When accessing web page on a user device 210, for example, HTML5 based web content with embedded audio and video elements, the mobile browser 212 often invokes the media player 211 and passes the embedded media elements to the media player 211 for playback. While the media player 211 is playing full screen, the mobile browsers 212 is hidden from the user. After the media player 211 finishes playing, or when the user stops and closes the media player 211, the mobile browser 212 reappears with the web page.

In one embodiment, there may be advertisements in rich media format, such as video ads, placed in the web page. A universal resource locator (URL) pointing to the advertisements is often passed to the web browsers 212 by the web server 220. The web browsers 212 then request the advertisements from the ad server 230 addressed by the URL. The web browsers 212 retrieve the content of the advertisements from the ad server 230 and pass the video to the media player 211 for playback.

The web server 220 and the ad server 230 are typically formed of one or more computers, such as the computer system 100 shown in FIG. 1. While only one server of each 220, 230 is shown in the environment 201 of FIG. 2, different embodiments may include multiple web servers, ad servers, or video servers operated by a single entity or multiple entities. In other embodiments, a single server may also provide different functionalities, such as delivering web content as a web server, as well as serving advertisements.

Figure 3:
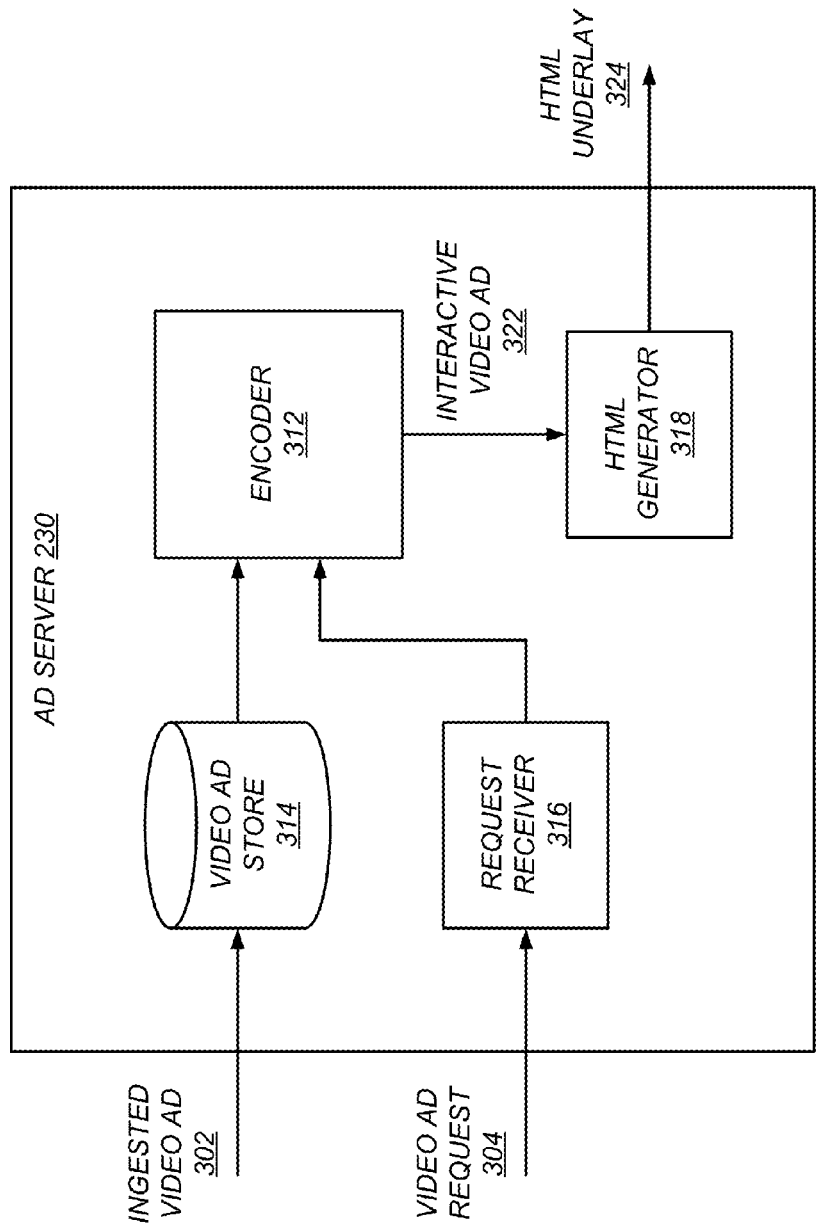
FIG. 3 illustrates one example embodiment of architecture of an ad server for providing interactive video ad with an HTML underlay.

Referring next to FIG. 3, it illustrates one embodiment of architecture of the ad server 230 for providing interactive video ad with an HTML underlay. The ad server 230 includes an encoder 312, a video ad store 314, a request receiver 316, and an HTML generator 318. In other embodiments, the ad server 230 may include additional, fewer, or different components for various applications. Conventional components such as network interfaces, security functions, load balancers, failover servers, management and network operations consoles, and the like are not shown so as to not obscure the details of the system architecture.

The video ad store 314 stores ingested video ads 302 received from advertisers or other third-party entities. In addition, the video ad store 314 may store metadata associated with video ads. The ad metadata identifies or otherwise describes the subject matter of the video ad, the genre of the video ad, the length of the video ad, the product or service represented by the video ad, or any other characteristic of the video ad.

The request receiver 316 receives a video ad request 306 from a mobile browser 212 on a user device 210. The request receiver 316 can detect the device type of the user devices 210 and communicate the detection of the device type to the encoder 312. Based on the device type detected by the request receiver 316, the encoder 312 selects one or more transparent frames appropriate for the device's native media player 211. Each of the transparent frames are imprinted with a text or graphic instructions on how to halt the native media player 211 and invoke an HTML underlay page using a gesture supported by the user device 210. The text or graphic instructions can be shown on the top, bottom or corners of the transparent frames. The encoder 312 also analyzes the video ad file from the video ad store 314 to determine how many frames are contained in the video ad. The encoder 312 then places the transparent frames with imprinted instructions on top of each frame in the video ad, and encodes the video file and the transparent frames into a new interactive video ad 322. In one embodiment, the encoder 312 generates the interactive video ad 322 on the fly in real time after the ad server 230 receives the video ad request 306. In other embodiments, the interactive video ad 322 can be encoded for popular user devices beforehand. When a request for video ad is received, an encoded interactive video ad can be readily retrieved from storage. In addition, the encoder 312 records in the video ad store metadata about the video ads, such as total video length and/or individual segment length (e.g, a video ad segment for 15s).

The HTML generator 318 generates an HTML underlay 324 for the interactive video ad 322. The HTML underlay 324 is an HTML page with an embedded link to resume playback of interactive video ad 322, which contains interactivity options presented on a stylized background of the brand of the product or service represented by the ad. The HTML underlay 324 is generated by the HTML generator 318 based on the requirement of the advertisers. For example, the advertisers or other third-party entities may provide the layout of the stylized brand background as well as the interactivity options, such as links to the brand web page or social media.

The HTML underlay generated by the HTML generator 318 can be a fully qualified HTML document, an HTML fragment, or a collection of HTML fragments included in an HTML iframe. The HTML underlay is loaded by the mobile browser above the original web page while the mobile browser rests beneath the native media player, so that when the media player is closed, the user is presented with an interactive experience related to the content of the video ad instead of the content of the original web page. The HTML underlay may contain any valid HTML elements (e.g., buttons, links, images, and embedded videos) and branded or logoed content tailored for the video ad in play. Additionally, the HTML underlay may include mechanisms that allow the user to stop the interactivity and resume the playback of the video ad. In one embodiment, this can be accomplished by having the original video element embedded in the underlay itself, thus the user could click or tap the video element to resume playback anytime during the interaction. In another embodiment, the HTML underlay may provide a button or a link for the user to click or tap to resume the playback of the video ad.

Figure 4:
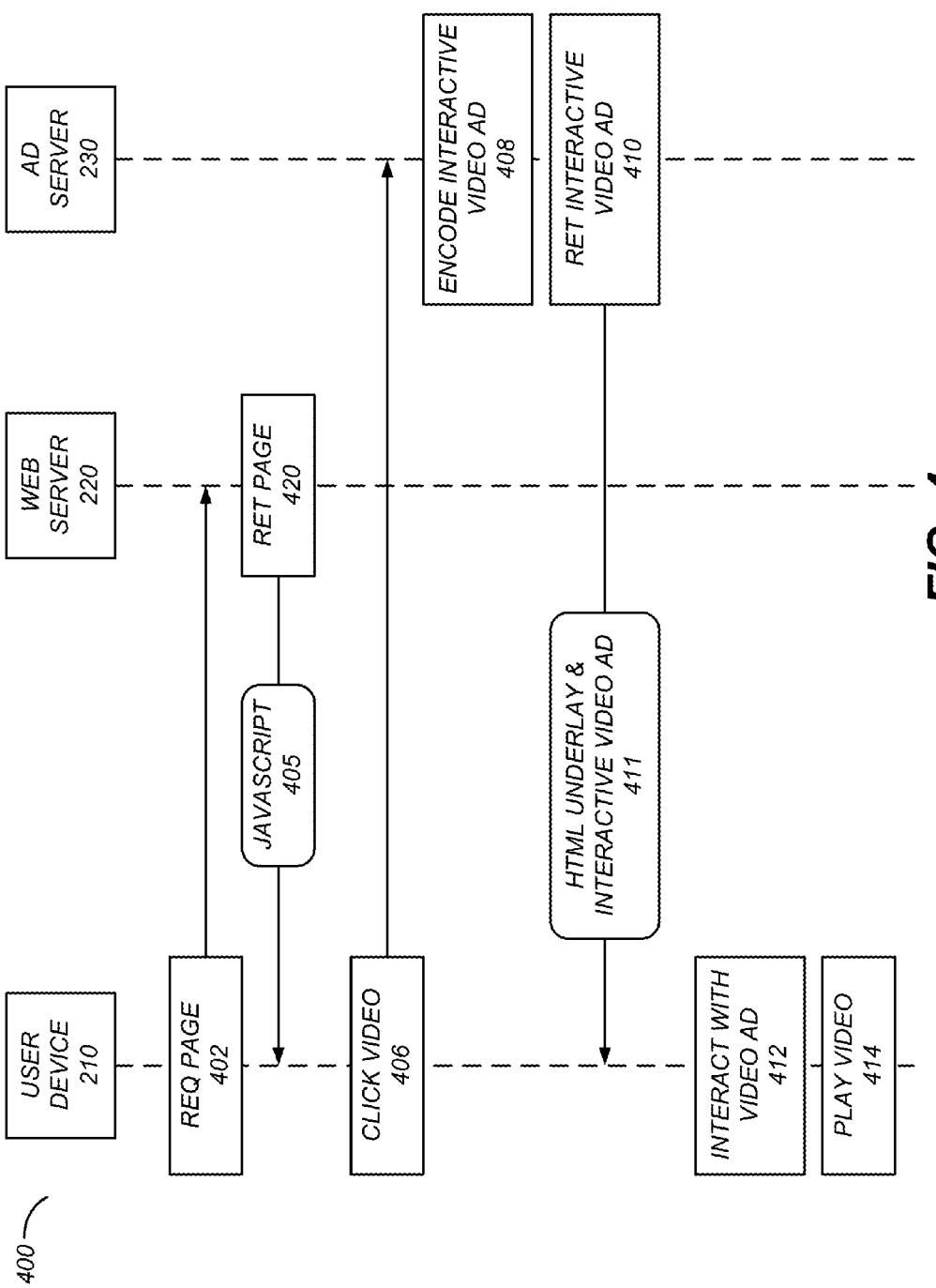
FIG. 4 illustrates one example embodiment of event trace in an example system for providing interactive video ad with an HTML underlay.

Next, FIG. 4 illustrates one embodiment of event trace 400 in an example system for providing interactive video ad with an HTML underlay. The system comprises user devices 210, a web server 220, and an ad server 230. The operation starts when mobile browser on the user device 210 sends a web page request 402 to web server 220, which returns 420 the web page in HTML5 with one or more embedded video elements. Each video element is shown as a small video player window in line with the text of the web page and a video ad is supposed to be played before playing the content the video element. The returned HTML5 page from the web server 220 also includes a JavaScript code 405. The JavaScript 405 implements a number of functions, such as instructs the mobile browser 212 on how and where to request interactive video ad 322 from ad server 230, and how to instrument and coordinate the placement and teardown of the HTML underlay 324 in response to the current time position of interactive video ad 322.

In one embodiment, the embedded video elements are encoded with standard time stamps (e.g., according to W3C HTML5 standards) so that the video can be played, stopped, and restarted at or approximately at any arbitrary point, and the current elapsed time of the video in play is available to the media player at any point. Alternatively, the JavaScript 405 executed on the user device 210 can monitor the video playback and mark the time independently, so that JavaScript 405 can place, tear down, or swap out the HTML underlay 324 based on the current position of the video ad. For example, during a consecutive playback of two 15-second video ads, the JavaScript 405 may swap the HTML underlay from a branded advertiser to the other at 15 second, and then remove the underlay entirely at the 30 second mark when both video ads finish playing. Additionally, should the user engage with the interactive underlay, the video ad can be resumed at or approximately at the time when the user stopped the playback.

Turning back to FIG. 4, when the user of the device 210 clicks 406 one of the video elements to play the video, the JavaScript 405 directs the mobile browser to request the video ad to be played from the ad server 230. Upon receiving the request for the video ad, the ad server 230 encodes an interactive video ad for the requesting user device. As described above, the interactive video ad is encoded by placing a series of transparencies onto each frame of the video ad, wherein the transparent frames show a gesture used for interacting with the video ad. Hence, when played the interactive video ad shows a text or graphic instruction overlaid on the screen on how to interact with the video ad (e.g., using a pinch gesture). The ad server 230 returns 410 an HTML underlay with an embedded link to resume playback of the interactive video ad to the mobile browser 212. The HTML underlay is a web page showing various interactivity options that can be activated when the user follows the instructions on the interactive video ad. The ad server 230 also returns video metadata for the video ad 322, such as an URL pointing to the ad video on the ad server 230 and timing data for the video ad (e.g., the video ad segment lasts for the first 15 second).

In an alternative embodiment, the JavaScript 405 may direct the mobile browser 210 to send a request for the video ad to the ad server 230 before the user is able to click on any video elements embedded in the web page, for example, when rendering the content of the web page received from the web server 220. After receiving the HTML underlay, video metadata and the source URL to the interactive video ad, the JavaScript running inside the mobile browser hides the HTML underlay and sets the video element source to the video source URL. Therefore, when the user clicks to play the video, the interactive video ad is ready to be played, i.e., video, metadata, underlay are all already available, and no further request to ad server 230 need be made.

The mobile browser on the user device 210 next passes the video ad to the native media player 211, which takes the place of the mobile browser on the screen and the mobile browser is hidden beneath the media player 211. The JavaScript 405 running in the mobile browser underneath the native media player 211 monitors the playback of the video ad. Once the video ad has started playing, the JavaScript 405 makes the HTML underlay available in full screen within the mobile browser which displays all the branded content and interactivity options that were previously hidden. This happens underneath the media player 211 and out of sight of the user who can only see the media player 211 as it loads and begins to play the video ad.

While watching the video ad, the user may interact 412 with the interactive video ad by performing the touch gesture as indicated by the overlaid instruction. In one embodiment, the touch gesture is the same gesture to close the device's media player 211. For example, since the gesture to close the media player 211 on an APPLE iPHONE is a pinch gesture, the interactive video ad may show an overlaid message like "pinch to interact." The user follows the instruction to interact by performing the touch gesture, which is understood by the native media player 211 as a dismissal command. The media player 211 closes and is removed from the top of the screen, while the mobile browser is once again activated and visible. At this point the user is able to see and interact with the interactivity options presented by the HTML underlay, such as visiting the brand website or sharing the experience on social networking systems. The HTML underlay contains a link or button that allows the user to resume playback of interactive video ad 322 from the current position so the user can simply tap on it to restart the playback and resume watching the interactive video ad, effectively dismissing the HTML underlay. The user may also ignore the instruction to interact and watch the video ad non-stop. Once the interactive video ad finishes, the content of the requested video can be played 414.

In other embodiments, various device states can be monitored and associated with controls or gestures in addition to the close gesture of the native media player. For example, on certain mobile devices, the mobile browsers may receive device-level events related to the physical state of the devices, such as switching between landscape and portrait modes and motion or rotation along some or all axes, while the native media player is in playback. In such cases, the JavaScript 405 that controls the display of the interactive video ad can monitor these events and in response, open or close the interactive video and display or hide the HTML underlay. In one embodiment, by monitoring acceleration along all three axes simultaneously, the JavaScript 405 could programmatically respond when the mobile device is 'shaken', 'flicked', or 'rotated', to close the media player and display the HTML underlay. In this implementation, the video encoder 312 can encode the video with transparent animations or text, informing the user to perform the gestures, such as 'Shake', 'Flick', and 'Rotate,' to invoke the interactivity from the interactive video ad (similar to the aforementioned native media player 'pinch' on an APPLE iPHONE).

Figure 5:
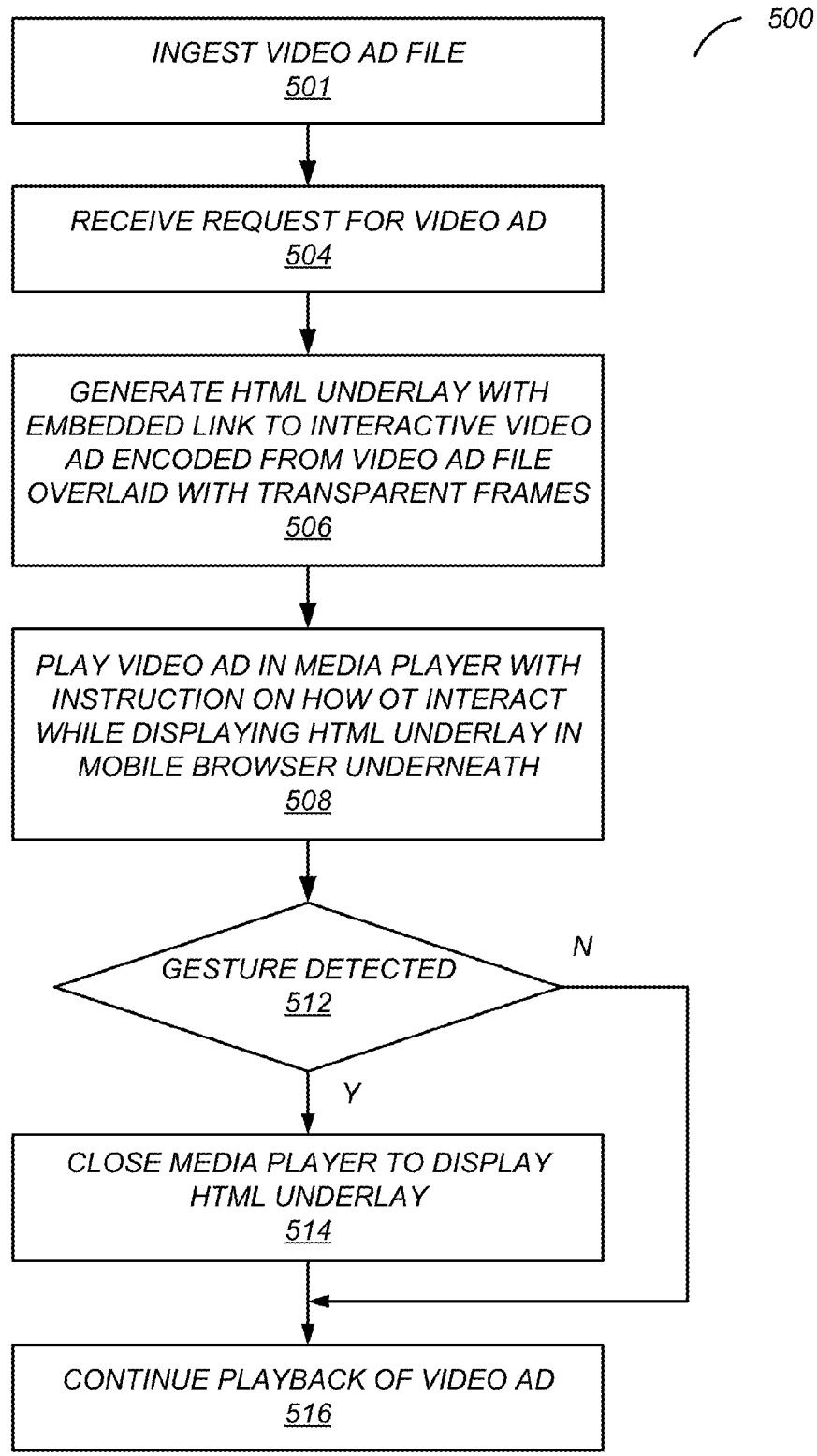
FIG. 5 illustrates one example embodiment of an example method for providing interactive video ad with an HTML underlay.

FIG. 5 illustrates one embodiment of an example method 500 for providing interactive video ad with an HTML underlay. First, the ad server 230 ingests 501 video ad file provided by advertisers or other third-party entities. The ingested video ad file can be stored by the ad server 230, for example, in the video ad store 314. Subsequently the ad server 230 may receives a request for the video ad from a mobile browser 212. For example, a user of the mobile browser 212 clicks a video element in an HTML5 web page, which is configured to play the video ad before the content of the video element is shown to the user. Upon receiving the video ad request, the ad server 230 generates 506 an HTML underlay with an embedded link to resume the interactive video ad which is encoded from the video ad with an overlaid transparent frame. The overlaid transparent frame adds an instruction on how to invoke the interaction (e.g., a touch gesture) to each frame of the video ad. The HTML underlay also includes interactivity options along with brand content represented by the video ad.

After receiving the HTML underlay, the mobile browser 212 passes the encoded interactive video ad to the native media player 211 on the user device 210 for playback 508 while displaying the HTML underlay underneath the media player 211. During the interactive video ad, if a gesture as indicated by the instruction on how to invoke the interaction is detected 512, the media player 211 is closed 514 and the HTML underlay is displayed in the mobile browser with the brand content and interactivity options, allowing the user to select any options to interact with the video ad. When user finishes the interaction and clicks the video link that resumes the video from the current position embedded in the HTML underlay, or there is no interaction gesture detected, the playback of the video ad is continued 516.

As the user watches the interactive video ad, the JavaScript 405 operating inside the mobile browser underneath the media player 211 monitors the state of the video playback. Under certain conditions, the HTML underlay is dismissed completely, allowing the user to return to the original web page after watching the content of the video element. For example, in one embodiment, the JavaScript 405 dismisses the HTML underlay once the interactive video ad is finished playing and the actual content of the video element starts to play.

Figures 6A, 6B:
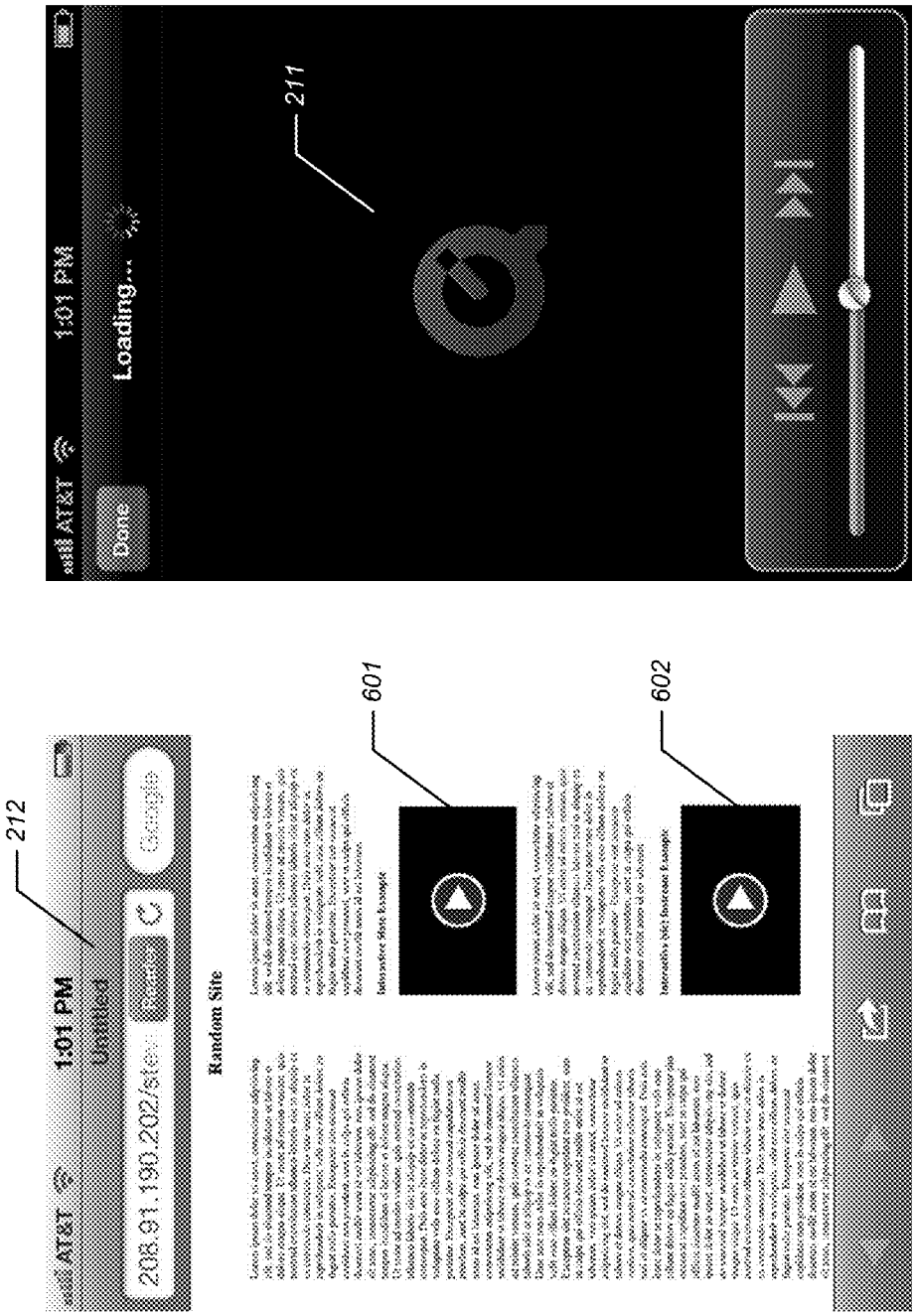

FIGS. 6A-6F illustrates a series example of screen shots of the interactive video playing experience on a user device 210. FIG. 6A shows the mobile browser 212, which displays an HTML5 web page with tow embedded video elements 601 and 602. FIG. 6B shows that the media player 211 is invoked and loading video after the user taps or clicks to play the video element 601. FIG. 6C illustrates the media player 211, which is playing the interactive video ad 322. At the bottom of the video ad, a text overlay 611 and a graphic overlay 612 are presented to instruct the user to interact with the video ad with a pinch gesture. The text overlay 611 and the graph overly 612 are encoded into the video ad by placing a transparent frame with the text and graphic instruction on top of each video frame in the video ad.

Next, the user follows the instruction by performing a pinch on the media player 211 to interact with video ad. The pinch gesture is a command understood by the media player 211 as a close command, thus the media player 211 is closed. As described above in reference to FIG. 4, the mobile browser 212 was hidden underneath the media player 211 while displaying the HTML underlay when the video ad is played. Since now the media player 211 is closed and the mobile browser 212 reappears, the HTML underlay 324 is now displayed in the mobile browser 212. As shown in FIG.

6D, the HTML underlay 324 presents brand content 621A and 621B, as well as interactivity options 622A-622C. The user may click or tap any of the interactivity options to visit the brand website or social networking sites. The link to resume interactive video ad 322 is also embedded in the HTML underlay 324, allowing user to tap on it to restart playing the video ad.

Figure 6F:
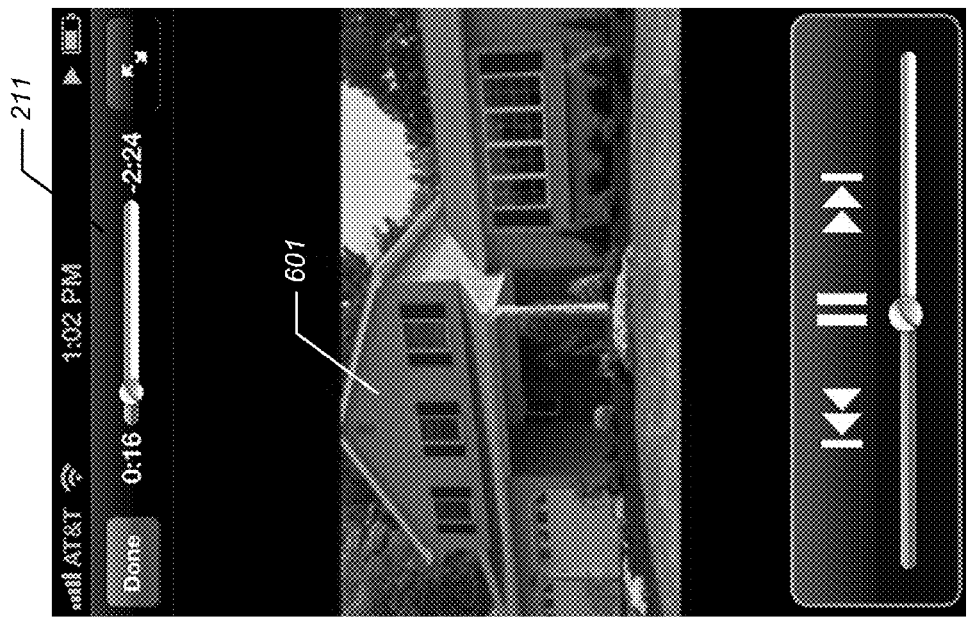
Figure 6E:
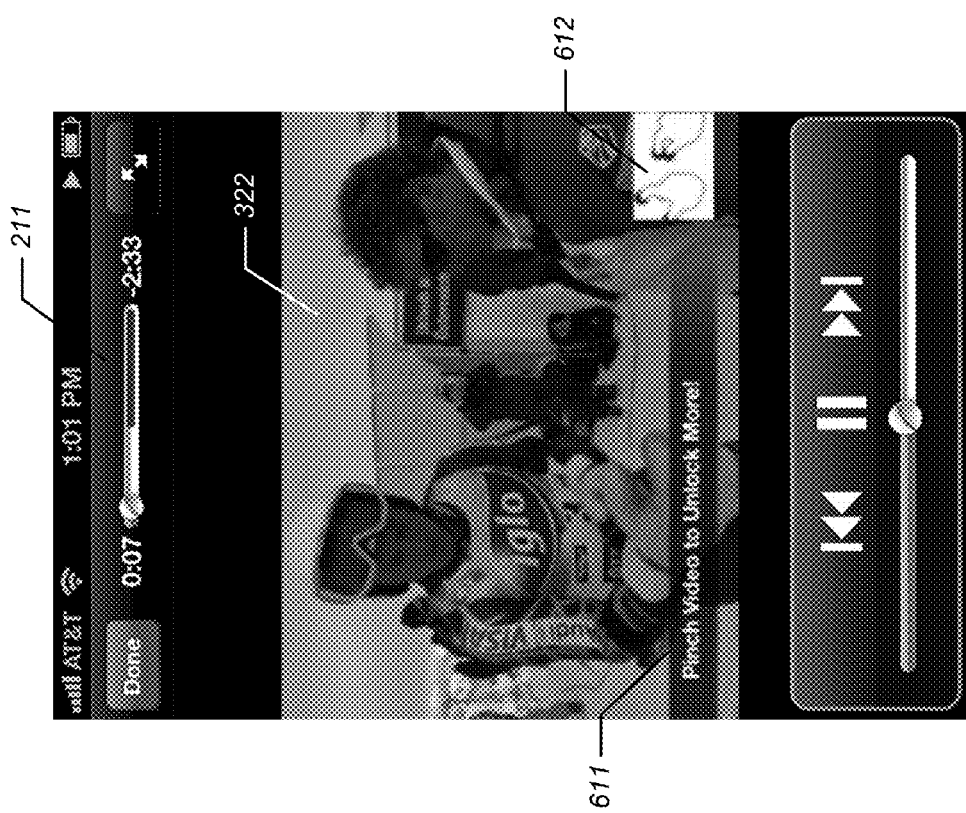

FIG. 6E shows that the user taps the embedded link to video ad 322 in the HTML underlay 324, and the media player 322 is reactivated to continue the playback of the video ad. The text overlay 611 and the graph overly 612 continues to be shown in the video ad. After the video ad 322 is finished, in this example, after 15 seconds, the media player 211 starts to play the video content for the video element 601, as illustrated in FIG. 6F.

The disclosed system achieves the following benefits and advantages. First, interactivity is achieved on the mobile platforms where the native media player runs outside the application context of the mobile browser. The solution includes showing video ad encoded with a transparent frame comprising text or graphic instructions to users on how to interact, as well as hiding an HTML underlay rendered by the browser in the background. As soon as the user performs the interactivity as instructed, the media player is closed and the HTML underlay is displayed with further interactivity links. Second, the text or graphic instructions superposed or overlaid on the video ad to inform users on how to further interact with the video ad are minimum and non-intrusive, while encouraging users to interact. In addition, the gesture controls used to start the interactivity with the video ad are often system built-in gestures to close the native media player. This design choice requires no changes or add-on widgets to the native media player on the user devices, but simply uses the close gestures as a signal to bring the HTML underlay from the browser to the top of the screen.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 4, 5, 6A, 6B, and 7) described herein may be performed, at least partially, by one or more processors (e.g., processor 102) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interactive video ad with an HTML underlay through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for providing interactive videos, comprising:
a processor; and
a non-transitory computer-readable storage medium storing executable computer program instructions for providing the interactive videos that when executed by the processor cause the processor to:
receive, from a mobile device, a request for a video file playable in a mobile browser, the mobile browser configured to display an original webpage embedded with a reference to the video file;
determine a device type of the mobile device;
select, based on the determined device type, a transparent frame and create an interactive video based on the video file by overlaying each frame in the video file with the selected transparent frame and one or more visible elements, the one or more visible elements including text and graphic instructions to interact with the video file and to invoke a hypertext markup language (HTML) underlay page on the mobile device;
generate, based on the identified device type, the HTML underlay page comprising an embedded link to control playback of the interactive video and including interactivity options to interact with the interactive video; and
transmit the HTML underlay page comprising the embedded link and the interactivity options and a link pointing to the interactive video to the mobile device, the HTML underlay page is configured to be available underneath the media player simultaneously while the interaction video is being played,
the one or more visible elements configured to be triggered responsive to a user interaction to pause the playing of interactive video in the media player and to cause the media player to be removed from the display, and
the HTML underlay page further configured to be presented over the original webpage responsive to the media player being removed from the display, to include the embedded link configured to include the interactivity options to the user, and to resume the interactive video responsive to the user's triggering of the interactivity options.

2. The system of claim 1, wherein the HTML underlay page comprises a first instruction to the mobile browser on how and where to request the interactive video and a second instruction to the mobile browser on how to instrument and coordinate a placement and teardown of the HTML underlay page in response to a time position of the interactive video.

3. The system of claim 1, wherein the executable computer program instructions are further configured to cause the processor to provide video metadata associated with the interactive video, the video metadata comprising an URL point to the interactive video and timing data for the interactive video.

4. The system of claim 1, wherein
the HTML underlay page is further configured to present the interactivity options for selection via the mobile browser,
the interactivity options are further configured to perform an interaction represented by the selection of the interactivity options, and
the HTML underlay page are further configured for activation of the media player and resume playing the interactive video responsive to receiving a request to resume playing the interactive video.

5. The system of claim 1, wherein the text and graphic instructions configured to interact with the interactive video and to invoke the HTML underlay page include a gesture to be performed on the mobile device.

6. The system of claim 5, wherein the gesture corresponds to a command to close the media player.

7. The system of claim 1, wherein the text and graphic instructions configured to interact with the interactive video and to invoke the HTML underlay page include a motion to change a physical state of the mobile device.

8. The system of claim 1, wherein the interactive video includes an advertising video clip, the HTML underlay page includes content associated with a brand represented by the advertising video clip, and the interactivity options include a link to a website or social media related to the brand represented by the advertising video clip.

9. The system of claim 1, wherein the HTML underlay page comprises a piece of JavaScript code configured to be executed in the mobile browser to:
monitor the playing of the interactive video, and
in response to detecting the media player completing playing the interactive video, cause the mobile device to dismiss the HTML underlay page and to cause the mobile browser to present the original webpage.

10. The system of claim 9, wherein the JavaScript code is further configured to manage the HTML underlay page simultaneously while monitoring the playing of the interactive video.

11. The system of claim 10, wherein the managing the HTML underlay page comprises placing the HTML underlay page based on a position of the interactive video, replacing the HTML underlay page with a different HTML underlay page, or removing the HTML underlay page from the mobile browser.

12. A non-transitory computer-readable storage medium storing executable computer program instructions for providing interactive videos, the executable computer program instructions comprising instructions that when executed causes the processor to:
receive a request for a video file playable in a mobile browser from a mobile device, the mobile browser configured to display an original webpage embedded with a reference to the video file;
determine a device type of the mobile device;
select, based on the determine device type, a transparent frame and creating an interactive video based on the video file by overlaying each frame in the video file with a transparent frame and one or more visible elements, the one or more visible elements including text and graphic instructions to interact with the video file and to invoke an HTML underlay page on the mobile device;
generate, based on the identified device type, the HTML underlay page comprising an embedded link to control playback of the interactive video and including interactivity options to interact with the interactive video; and
transmit the HTML underlay page comprising the embedded link and the interactivity options and a link pointing to the interactive video to the mobile device, the HTML underlay page is configured to be available underneath the media player simultaneously while the interaction video is being played,
the one or more visible elements configured to be triggered responsive to a user interaction to pause the interactive video to pause the playing of interactive video in the media player and to cause the media player to be removed from the display, and
the HTML underlay page configured to be presented over the original webpage responsive to the media player being removed from the display, to include the embedded link configured to include the interactivity options to the user, and to resume the interactive video responsive to the user's triggering of the interactivity options.

13. The non-transitory computer-readable storage medium of claim 12, wherein the HTML underlay page comprises a first instruction to the mobile browser on how and where to request the interactive video and a second instruction to the mobile browser on how to instrument and coordinate a placement and teardown of the HTML underlay page in response to a time position of the interactive video.

14. The non-transitory computer-readable storage medium of claim 12, wherein the computer program instructions further comprise instructions that when executed causes the processor to provide video metadata associated with the interactive video, the video metadata comprising an URL point to the interactive video and timing data for the interactive video.

15. The non-transitory computer-readable storage medium of claim 12, wherein
the HTML underlay page are further configured to present the interactivity options for selection via the mobile browser,
the interactivity options are further configured to perform an interaction represented by the selection of the interactivity options, and
the HTML underlay page is further configured for activation of the media player and resume playing the interactive video responsive to receiving a request to resume playing the interactive video.

16. The non-transitory computer-readable storage medium of claim 12, wherein the text and graphic instructions are configured to interact with the interactive video and to invoke the HTML underlay page include a gesture to be performed on the mobile device.

17. The non-transitory computer-readable storage medium of claim 12, wherein the HTML underlay page comprises a piece of JavaScript code configured to be executed in the mobile browser to:
monitor the playing of the interactive video, and
in response to detecting the media player completing playing the interactive video, cause the mobile device to dismiss the HTML underlay page and to cause the mobile browser to present the original webpage.

18. The non-transitory computer-readable storage medium of claim 17, wherein the JavaScript code is further configured to manage the HTML underlay page simultaneously while monitoring the playing of the interactive video.

19. The non-transitory computer-readable storage medium of claim 18, wherein the managing the HTML underlay page comprises placing the HTML underlay page based on a position of the interactive video, replacing the HTML underlay page with a different HTML underlay page, or removing the HTML underlay page from the mobile browser.

20. A method for providing interactive video, the method comprising:
receiving a request for a video file playable in a mobile browser from a mobile device, the mobile browser displaying an original webpage embedded with a reference to the video file;
creating an interactive video based on the video file by overlaying each frame in the video file with a transparent frame and one or more visible elements, the one or more visible elements including text and graphic instructions to interact with the video file and to invoke an HTML underlay page on the mobile device;
generating the HTML underlay page comprising an embedded link to control playback of the interactive video and including interactivity options to interact with the interactive video; and
transmitting the HTML underlay page comprising the embedded link and the interactivity options and a link pointing to the interactive video to the mobile device, wherein
the HTML underlay page is configured to be available underneath the media player simultaneously while the interaction video is being played,
the one or more visible elements configured to be triggered responsive to a user interaction to pause the interactive video to pause the playing of interactive video in the media player and to cause the media player to be removed from the display, and
the HTML underlay page configured to be presented over the original webpage responsive to the media player being removed from the display, to include the embedded link configured to include the interactivity options to the user, and to resume the interactive video responsive to the user's triggering of the interactivity options.

* * * * *